United States Patent Office 2,955,094
Patented Oct. 4, 1960

2,955,094

PROCESS FOR PREPARING STABLE ISOOLEFIN-MULTIOLEFIN RUBBERY POLYMER LATICES CONTAINING ORTHO-PHOSPHORIC ACID AND ORGANIC SULFATE SALTS

Robert S. Brodkey, Roselle, and Alfred L. Miller, Cranford, N.J., assignors to Esso Research and Engineering Company, a corporation of Delaware No Drawing. Filed June 21, 1956, Ser. No. 592,723

13 Claims. (Cl. 260—29.7)

This invention relates to improvements in the preparation of emulsion latices from hydrocarbon polymers. More particularly it relates to a method for preparing stable emulsions from solutions of hydrocarbon polymers. Specifically, it relates to a highly stable butyl latex formed by emulsifying butyl rubber with an organic sulfate salt.

It has been known for some time that latices of high polymer materials may be produced by the emulsion polymerization technique. However, it is often desired to prepare emulsions from already prepared solid rubbery and resinous materials, such as those prepared by Friedel-Crafts catalyst polymerization techniques which at present cannot be prepared by emulsion polymerization. Dispersions of these materials are generally prepared by working large amounts of dispersing agents, up to 50% or more based on the polymer, into the solid polymer, plus some water to give a thick water-rubber emulsion. This dispersion is then inverted to form a rubber-water dispersion. Because of the necessity of using excessive amounts of dispersing agents which is undesirable for most uses, the solution technique is more adapted to large scale production. According to this method, the polymer is dissolved in a suitable solvent and the emulsifier and water are added with stirring. The solvent is then stripped from the resulting emulsion to form the aqueous latex. The latex may then, if desired, be concentrated for example by creaming, centrifuging, or further heat stripping.

Latex, in a broad sense, is a colloidal water emulsion of a rubbery substance. Butyl latices are generally prepared by emulsifying a solution of butyl rubber in water by means of a salt, such as sodium or potassium oleate. Experience has shown that these latices are relatively unstable and tend to coagulate when subjected to mechanical stress. Mechanical instability may be brought about by the simple movement of an agitator stirring the colloid. Maintenance costs are increased because the equipment becomes coated with the coagulated rubber. Furthermore, an appreciable quantity of the rubber is lost, thus making the product economically unattractive.

Another type of instability encountered with conventional butyl latices is that they oil-out and develop coagulum during the stripping step. This is commonly referred to as processing instability. In some cases, as much as 50% of the latex may separate out after the solvent has been removed.

It has now been found that butyl latices having excellent mechanical and processing stability may be prepared by employing organic sulfate salts as the emulsifier and a salt of dihydrogen ortho-phosphate as the stabilizer.

In accordance with the present invention 100 parts by weight of butyl rubber, dissolved in a solvent, is dispersed in water containing about 2 to 20 phr. (parts by weight per 100 parts of rubber) of an organic sulfate emulsifier having about 8 to 14 carbon atoms and about 0.25 to 2 phr. (parts by weight per 100 parts of rubber) of a stabilizing agent which is a monovalent salt of dihydrogen ortho-phosphate.

The present invention will be best understood from the following description. Before going into the invention in detail, the nature of the rubbery materials employed will be more particularly set forth.

Butyl rubber is the copolymer of isobutylene with a multiolefin prepared at low temperatures with a Friedel-Crafts catalyst. The major component of the copolymer is preferably isobutylene. The minor component is a multiolefin having from 4 to 12 or 14 carbon atoms, preferably 4 to 8 carbon atoms. The preferred multiolefins are butadiene, isoprene, hexadiene, piperylene and dimethyl butadiene, but other diolefins such as myrcene, allocymene and the like may be used. Of these materials, isoprene is at the present time regarded as the best multiolefin. The isobutylene and the multiolefin are mixed in the ratio of a major proportion of isobutylene and a minor proportion of isoprene, the preferred range being 1 to 10 parts isoprene and 99 to 90 parts isobutylene. High purity is desirable in both materials and it is preferable to use an isobutylene of at least 99% purity, although satisfactory copolymers can be made of materials of considerably lower purity. The mixture of monomers is cooled to a temperature within the range of between −40° C. and −164° C., the preferred range being between −78° C. and −103° C. The material may be cooled by the use of a refrigerating jacket upon the mixing tank and polymerizer, in which case any refrigerant which will yield the desired temperature is satisfactory. Alternatively, the cooling may be obtained by an internal refrigerant which is mixed directly with the olefinic copolymerizate. For this purpose, such materials as liquid propane, solid carbon dioxide, liquid ethane and liquid ethylene are satisfactory. In some instances liquid methane may be employed, although usually the temperature of boiling liquid methane is undesirably low.

The cold mixture is then polymerized by the addition of a Friedel-Crafts catalyst, preferably in a liquid or dissolved form. Ordinarily an amount of catalyst ranging from 0.15% to about 1.0% of the weight of the mixed olefins is required to polymerize them into a high molecular weight polymer. A partial copolymerization may be obtained by limiting the quantity of catalyst added.

In the polymerization reaction, the liquid catalyst may be sprayed on to the surface of the rapidly stirred, cold olefinic material, or a small high pressured stream of catalyst may be directed into the body of the rapidly stirred mixture. In both processes powerful and efficient stirring is needed to disperse the catalyst into the mixture.

The polymerization proceeds rapidly to yield the desired polymer which precipitates out from the solution in the form of a flocculent white solid having many of the physical characteristics of raw gum rubber. When the polymerization has reached the desired stage, the material is conveniently recovered by discharging the whole mixture into warm water which may contain an alcohol or some other compound to inactivate the catalyst. The warm water serves the purpose of flashing off the excess refrigerant, the unpolymerized olefins and the catalyst solvent. The polymer is then recovered from the water suspension by any convenient manner, such as straining or filtering, or otherwise as may be convenient. The polymer is then dried either as a blanket passing through a tunnel drier or on a mill.

The product is a plastic and elastic material. It has a Staudinger molecular weight within the range between about 35,000 and 90,000, the minimum useful molecular weight being about 20,000 and the preferred range between about 45,000 and 60,000. The rubber has a Wijs iodine number between about 1 and 20, and a maximum iodine number of about 50, the preferred iodine number being about 7 to 15. The rubber materials may contain pigments, reinforcing agents, softeners, vulcanizers, accelerators, anti-oxidants, or other compounding ingredients.

In the practice of the present invention, the rubbery polymer is dissolved in a hydrocarbon solution, preferably an aliphatic hydrocarbon with 6 to 8 carbon atoms, e.g., hexane. The hydrocarbon solution is emulsified in the presence of water containing an emulsifier system and stabilizer. To perform this emulsification mechanical work must be supplied to break the hexane solution into colloidal particles. This mechanical action is aided to a considerable extent by the character of the emulsifier system in terms of its efficiency in reducing the surface tension between the oil and water phases and its ability to protect the newly formed particles from agglomeration. Machines which are commonly used include high speed stirrers, such as a Dispersator, high shear producing machines, such as colloid mills and high pressure homogenizers and shear producers such as the Rapisonic and Minisonic Homogenizers.

The emulsifiers which may be used in accordance with the present invention are alkali metal, alkaline earth, ammonium or amine salts of organic sulfates having about 8 to 14 carbon atoms, and preferably about 10 to 14 carbon atoms. Emulsifiers having 12 to 14 carbon atoms are especially desirable. Generally they are aliphatic and saturated, although unsaturated aliphatic and cyclic derivatives may be used. It has been found that these sulfates produce latices having a mechanical stability superior to those latices formed with soap, such as potassium oleate.

Furthermore, the use of relatively small quantities of a hydrogen ortho-phosphate salt unexpectedly increases the mechanical and processing stability of these emulsions. It has been found that about 0.25 to about 2 phr. of the phosphate are satisfactory amounts for the production of these highly stabilized emulsions, but it is preferred to use about 0.5 to about 1.5 phr. (parts per 100 parts rubber) of the stabilizer. An especially desirable range is about 1 to 1.5 phr. These quantities of dihydrogen ortho-phosphate salt, when used alone, are incapable of producing a satisfactory emulsion according to the procedures set forth herein. Thus, the enhanced effect that they produce in combination with the anionic sulfate is not additive.

In one embodiment of this invention, the emulsion is prepared in a Minisonic Homogenizer having a funnel with a gear pump and a bell attached to its base. In addition it has a recycle line and a rubber cement injection line through which the rubber is introduced. The funnel is charged with water containing the emulsifier and stabilizer. The aqueous solution is recycled by means of the gear pump for about 1 minute. In this operation, the liquid passes through the pump which forces it through an orifice and sprays it over a reed in the bell. The solution returns to the funnel by means of a recycle line. After the recycling step, the rubber cement, which is generally a hydrocarbon solvent containing about 15 to 35% by weight butyl rubber, preferably 15–20%, is introduced to the homogenizer through a line which terminates just above the gears of the pump. The coarse emulsion formed in the pump is sprayed through an orifice and is converted to a fine emulsion by the sonic cavitation produced by the reed. The emulsion is recycled for about 6 to 30 minutes, generally about 12 minutes, before it is withdrawn from the homogenizer and stripped of the hydrocarbon solvent.

The stripping operation may be carried out at elevated temperatures and atmospheric pressures until no more solvent can be removed. If a high solids latex is desired, water may be removed by vacuum stripping. Because foaming may occur during this step in the process, the latex is sometimes diluted with stripped or partly stripped latex, or in other cases, with an anti-foaming agent, such as Dow Antifoam A Emulsion, a polysilicone oil, which may be added just prior to the removal of the solvent.

The amount of water contained in the emulsion is not critical as long as there is enough water present to produce a stable water-reducible emulsion. Accordingly, therefore, for shipping purposes the most desirable form is a concentrated emulsion. The rubber solids may be reduced at the time of application by adding whatever water is desired to provide a good working consistency.

In the practice of this invention about 200 to 300 cc. of water containing from about 2 to 20 phr. of an emulsifier, such as sodium lauryl sulfate or sodium tridecyl sulfate, and about 0.25 to 2 phr. of a stabilizer, such as sodium dihydrogen ortho-phosphate, is charged into the funnel of the homogenizer and recycled for about 1 minute. The recycling step insures a homogeneous solution of emulsifier and stabilizer. At the end of this time, 100 parts by weight of butyl rubber, dissolved in a suitable solvent, such as hexane, is injected into the homogenizer over a 2 minute period. The cement is usually about a 20% by weight solution of butyl rubber. The crude rubber cement emulsion produced during the 2 minute injection period is then recycled for an additional twelve minutes. In some cases, the additional recycle time is as long as about 25 minutes and as brief as about 6 minutes. The emulsion is withdrawn by lowering the open end of the recycle line to a point below the level of the liquid and allowing the emulsion to drain from the homogenizer.

At this point, small quantities of anti-foam agents may be added to the emulsion to prevent excess foaming during the stripping step. The solvent may be removed from the emulsion by any suitable means, for example, it may be heated at atmospheric pressure until all of the removable solvent has distilled over. If desired, the distillation may be effected under reduced pressure. The resulting butyl rubber latex has excellent mechanical stability properties.

The resulting butyl latices contain between about 20–40% by weight total solids and may be diluted to as low as 5% by weight or concentrated to as high as 65% by weight by removing water. The general composition of these latices is as follows:

| Ingredients | Parts by Weight on Total | |
| --- | --- | --- |
| | Range | Preferred |
| Butyl rubber | 18–60 | 30–50 |
| Emulsifier | 0.4–12 | 1–3 |
| Stabilizer | 0.05–1.2 | .25–1 |
| Anti-Foaming Agent | 0–0.05 | 0–0.05 |
| Water | Balance | Balance |

The mechanical stability of the butyl latices prepared according to the foregoing description was determined by the following technique. Each sample of latex was diluted with water to form an emulsion having 10% by weight total solids. The diluted latex sample was then subjected to a high speed Hamilton-Beach mixer, Model No. 33, for 3 minutes. The stirrer shaft, which was about 0.25" in diameter, had a disk (about 0.8" diameter) attached to its lower end and was rotated at about 22,000 r.p.m. The test bottle, a pear-shaped glass container, was positioned such that the stirrer shaft was concentric with the axis of the bottle and the stirrer disk was about at ½" above the bottom of the container. Following the 3 minute agitation period each sample was allowed to stand for 5 minutes at room temperature before it was filtered through a 46 mesh screen. The screen was then dried by a suitable means, for example under an infra-red lamp, and weighed. The coagulant formed during the stirring operation was expressed in terms of weight percent coagulant (relative to total solids content).

Another method of determining stability is known as the processing flocculation test. This test determines the total rubber which coagulates or oils-out after emulsification is complete. This is measured by first allowing the butyl-solvent emulsion to stand overnight (16 to 20 hours) at room temperature. Any coagulated rubber formed during this period is removed, dried and weighed. Then the rest of the emulsion is stripped of solvent at atmospheric pressure and an elevated temperature and allowed to cool before being filtered through cheesecloth. The coagulated rubber is dried and weighed. The value is expressed as weight percent coagulant and is referred to as the "stripping floc." When this value is combined with the value obtained when the emulsion stood overnight, it is referred to as the total "processing floc."

An additional test is employed after the emulsion has been stripped of solvent. Here notice is taken as to whether or not the emulsion has a skin or concentrated rubbery layer. The skin, though undesirable because of its appearance, is readily reconstituted.

The advantages of this invention will be better understood from a consideration of the following experimental data which are given for the sake of illustration, but without intention of limiting the invention thereto.

EXAMPLE I

A number of organic sulfates were studied to determine their suitability for use as butyl rubber emulsifiers. In each case 25 parts by weight of butyl rubber dissolved in hexane (20% by weight) was dispersed in 110 cc. of water containing 3.5 to 20 phr. emulsifier and 1.0 phr. sodium dihydrogen orthophosphate as stabilizer, according to the procedure outlined above. The emulsions were then examined.

*Table 1*

| Emulsifier | phr. Necessary to Make Emulsion | Emulsion Quality |
|---|---|---|
| Sodium Octyl Sulfate | 10 | fair. |
| Sodium Lauryl Sulfate | 3.5 | excellent. |
| Sodium Tridecyl Sulfate | 5.0 | Do. |
| Sodium Cetyl Sulfate | 20 | poor. |
| Calcium Lauryl Sulfate | 3.5 | good. |
| Ammonium Lauryl Sulfate | 3.5 | excellent. |
| Triethanolamine Lauryl Sulfate | 3.5 | Do. |

These data illustrate the unique ability of the lauryl and tridecyl derivatives to produce stable butyl latex emulsions. While the $C_8$ derivative produced a fair emulsion it is preferred to use $C_{10}$ to $C_{14}$ emulsifiers, such as lauryl and tridecyl sulfate. Since these two materials show exceptional qualities, the range between $C_{12}$ and $C_{14}$ is especially desirable.

Further evidence of the uniqueness of the lauryl derivative was noted when a small amount of sodium cetyl sulfate was mixed with lauryl sulfate and the combination of the two emulsifiers was evaluated as above. Though the emulsion formed by this mixture was not poor, it did not have the high quality and uniformity produced when sodium lauryl sulfate alone was employed.

EXAMPLE II

In order to further stabilize the emulsion product a number of salts were evaluated in combination with one of these emulsifiers. In each case, 100 parts by weight of butyl rubber, 20% by weight dissolved in hexane, was dispersed in 250 cc. of water containing 3.5 phr. sodium lauryl sulfate and 0.4 phr. stabilizer. The cement solution was injected over a 2 minute period and the mixture was recycled for an additional 12 minutes. Prior to the solvent stripping step, 0.1 phr. of a silicone anti-foaming agent (Dow Antifoam A Emulsion) was added to the emulsion. The emulsion was stripped of solvent at an elevated temperature and the resulting latex was evaluated for stability.

*Table 2*
EFFECT OF VARIOUS STABILIZERS ON EMULSIFICATION

| Stabilizer (0.4 phr.) | None | $NaH_2PO_4$ | $Na_2HPO_4$ | $Na_2SO_4$ | $Na_4SiO_4$ (Metso 99) | $Na_3PO_4$ |
|---|---|---|---|---|---|---|
| Stripping floc, percent | 9.3 | 4.5 | 15.6 | 11.0 | 10.7 | 11.0. |
| Total floc, percent | 10.4 | 4.5 | 16.7 | 11.6 | 10.9 | 11.6. |
| Mech. Stability, percent | 23 Foam | 10 | | | | |
| pH of Latex Product | 9.2 | 6.9 | 7.9 | 9.1 | 10.3 | 9.0. |
| Viscosity | Medium | Medium | Medium | High | Very High | Low. |
| Visual | Clear | Skin | Skin | Skin | Skin | Heavy Skin. |

The above data demonstrate the superiority of the dihydrogen ortho-phosphate salt over the other salts studied. It not only greatly reduced the tendency of the emulsion to flocculate during the processing stage, as indicated by the stripping and total floc above, but it also enhanced the mechanical stability of the emulsion. Furthermore, it did not increase viscosity, which means it will be easy to handle. The formation of skin in the dihydrogen ortho-phosphate sample, though not desirable from an appearance standpoint, is not a defect in the sample since it can be readily reconstituted by mixing. The singularity of this combination of dihydrogen ortho-phosphate and lauryl sulfate is further brought out by the fact that when 5 phr. of sodium cetyl sulfate was combined with 0.4 phr. of sodium dihydrogen orthophosphate, a very poor emulsion was produced.

EXAMPLE III

An experiment was undertaken to determine the effect of varying the concentration of the emulsifier on the stability of the emulsion produced. The latices were made according to the general procedure outlined and in each case 0.1 phr. of a silicone anti-foaming agent (Dow Antifoam A Emulsion) was added prior to the stripping step. 0.4 phr. sodium dihydrogen ortho-phosphate was used in combination with the emulsifier in the homogenization step. The butyl rubber was added in the form of a 20% by weight solution.

*Table 3*
EFFECT OF VARYING THE CONCENTRATION OF EMULSIFIER ON THE STABILITY OF THE EMULSION

| phr. of Na Lauryl Sulfate | 4.65 | 3.5 | 2.0 |
|---|---|---|---|
| Stripping Floc (percent) | 3.6 | 4.5 | 12.1. |
| Total Floc (percent) | 3.6 | 4.7 | 12.7. |
| Mech. Stability (percent) | 11 Foam | 10 | 29. |
| pH of Latex Product | 7.0 | 6.9 | 6.8. |
| Viscosity (Crude) | Medium | Medium | Medium. |
| Visual Inspection | Skin | Skin | Heavy Skin. |

The results illustrate that at this level of stabilizer (0.4 phr.) optimum stability properties are obtained with emulsifier concentrations between about 3 and 5 phr. (parts by weight per 100 parts rubber). The combination of sodium lauryl sulfate in this range with the quantity of stabilizer employed produces an emulsion having excellent processing (as indicated by the stripping and total floc) and mechanical stability.

EXAMPLE IV

Another study was made to determine the effect of varying the quantity of stabilizer on the mechanical and processing stability. The samples were prepared according to the general procedure outlined above, and in Example II, with the exception that the only salt employed was sodium dihydrogen ortho-phosphate and no anti-foaming agent was used except as noted below.

*Table 4*

EFFECT OF VARYING STABILIZER CONCENTRATION ON EMULSION STABILITY

| phr. of $NaH_2PO_4$ | 0 | 0.4 | | 1.0 | | 2.0 | |
|---|---|---|---|---|---|---|---|
| phr. of Na Lauryl Sulfate | 3.5[a] | 2.0[b] | 3.5 | 2.0 | 3.5 | 2.0 | 3.5 |
| Stripping floc, percent | 9.3 | 12.1 | 2.7 | 5.3 | 2.1 | 7.8 | 2.5. |
| Total floc, percent | 10.4 | 12.7 | 3.0 | 5.8 | 2.9 | 8.4 | 4.0. |
| Mech. Stability, floc, percent | 23 | 29 | 11 | 21 | 1 | 46 | 2. |
| pH of Latex Product | 9.2 | 6.8 | 7.0 | 6.5 | 6.1 | 6.0 | 5.8. |
| Viscosity (crude) | Medium | Medium | Medium | Low | Very Low | Very Low | Very Low. |
| Visual Inspection | Skin | Heavy Skin | Skin | Clear | Clear | Clear | Clear. |

[a] 0.2 phr. Dow Antifoam A Emulsion.
[b] 0.1 phr. Dow Antifoam A Emulsion.

These data show that even minute quantities of this stabilizer are very effective. Plotting the above data leads to the conclusion that as little as 0.25 phr. of dihydrogen ortho-phosphate salt will have a noticeable effect on floc and mechanical stability particularly where the concentration of the emulsifier is about 3.5 phr. Furthermore, there is evidence that there is little to be gained by way of improved stabilization by increasing the stabilizer's concentration above about 2 phr. The visual evaluation of the emulsion shows that higher amounts of dihydrogen ortho-phosphate produce solutions which are free of skin. For this reason, and others, the preferred level of stabilizer is about 1 phr.

In summary, therefore, it has been found that certain combinations of an alkali metal, alkaline earth, amine or ammonium salt, preferably sodium salt, of organic sulfates having about 8 to 14 carbon atoms, and a monovalent salt of dihydrogen ortho-phosphate produce butyl rubber latices having unexpectedly improved mechanical and processing stability. In accordance with this invention, about 2 to about 20 phr., advantageously about 2 to 10 phr. and preferably about 3 to 5 phr., of a salt of an organic sulfate, having about 8 to 14, preferably 10 to 14 carbon atoms, and about 0.25 to about 2 phr., preferably about 0.75 to about 1.5 phr., of an alkali metal or ammonium salt of dihydrogen ortho-phosphate coact to emulsify butyl rubber in an aqueous system and produce a highly stable latex. An especially desirable form of the present invention is where about 3½ to 4 phr. of a $C_{12}$ to $C_{14}$ sulfate is combined with about 1 to about 1½ phr. of dihydrogen ortho-phosphate.

The latices obtained in accordance with this invention are suitable for use in the preparation of foam rubber sponge extenders, paper size, paper shades and drapes, tire cord coating compositions, emulsion paints, laminant for paper, wood, canvas, and plywood, binder for cork, wood, fiber and leather buffings, industrial gloves and protective clothing, dipped goods and adhesives.

In the appended claims it is intended to claim all novelty inherent in the invention as well as all modifications coming within the scope and spirit of the invention.

What is claimed is:

1. A process for the preparation of a stable rubber latex which comprises emulsifying a 15 to 35% solution in a $C_6$ to $C_8$ hydrocarbon solvent of 100 parts by weight of a low unsaturation isoolefin-diolefin rubbery copolymer, having an iodine number of between about 1 and 50, in water containing about 0.25 to 2.0 parts by weight of a monovalent alkali metal dihydrogen salt of ortho-phosphoric acid and about 2 to 20 parts by weight of a water soluble salt of an organic aliphatic sulfate having about 8 to 14 carbon atoms and being selected from the group consisting of alkali metal, alkaline earth, amine and ammonium salts, stripping off the solvent from the emulsion and recovering a stable rubber latex in water containing about 5 to 65% rubber solids.

2. A process for the preparation of a stable rubber latex which comprises emulsifying a 15 to 20% solution in a $C_6$ to $C_8$ aliphatic hydrocarbon solvent of 100 parts by weight of a low unsaturation rubbery copolymer of isobutylene and a conjugated diolefin having about 4 to 8 carbon atoms and an iodine number of between about 1 and 50, in water containing about 0.25 to 2.0 parts by weight of a monovalent alkali metal dihydrogen salt of ortho-phosphoric acid and about 2 to 20 parts by weight of a water soluble salt of an organic aliphatic sulfate having about 8 to 14 carbon atoms and being selected from the group consisting of alkali metal, alkaline earth, amine and ammonium salts, stripping off the solvent and recovering a stable rubber latex in water containing about 20 to 40% rubber solids.

3. A process for the preparation of a stable synthetic rubber latex which comprises emulsifying a 15 to 35% solution in a $C_6$ hydrocarbon solvent of 100 parts by weight of a rubbery copolymer of isobutylene and a diolefin having about 4 to 8 carbon atoms and an iodine number of between about 1 and 50, in water containing about 0.25 to 2.0 parts by weight of an alkali metal dihydrogen ortho-phosphate and about 2 to 10 parts by weight of an alkali metal alkyl sulfate having about 10 to 14 carbon atoms, stripping off the solvent from the emulsion and recovering a stable latex in water containing about 5 to 65% solids.

4. A process for the preparation of a stable synthetic rubber latex which comprises emulsifying a 15 to 35% solution in a hydrocarbon solvent of 100 parts by weight of a rubbery copolymer of isobutylene-isoprene having an iodine number of between about 1 and 50, in water containing about 0.25 to 2.0 parts by weight of sodium dihydrogen ortho-phosphate and about 2 to 5 parts by weight of sodium lauryl sulfate, stripping off the solvent and recovering a stable latex in water containing about 5 to 65% solids.

5. A process according to claim 2 in which the organic sulfate has about 10 to 14 carbon atoms.

6. A process according to claim 2 in which the organic sulfate has about 12 to 14 carbon atoms.

7. A process according to claim 2 in which the amount of organic sulfate is between about 2 and 10 parts by weight.

8. A process according to claim 2 in which the amount of organic sulfate is between about 3 and 5 parts by weight.

9. A process according to claim 2 in which the organic sulfate salt is sodium lauryl sulfate.

10. A process according to claim 2 in which the organic sulfate salt is sodium tridecyl sulfate.

11. A process according to claim 2 in which the amount of metal dihydrogen salt of orthophosphoric acid is between about 0.75 and 1.5 parts by weight.

12. A process according to claim 2 in which the metal dihydrogen salt of orthophosphoric acid is sodium.

13. A process according to claim 3 in which the alkyl sulfate has 12 to 14 carbon atoms.

References Cited in the file of this patent

UNITED STATES PATENTS

| | | |
|---|---|---|
| 2,357,861 | Willson | Sept. 12, 1944 |
| 2,375,140 | Semon | May 1, 1945 |
| 2,444,801 | Arnundale | July 6, 1948 |
| 2,570,253 | Lundquist et al. | Oct. 9, 1951 |
| 2,662,064 | Mead | Dec. 8, 1953 |
| 2,769,711 | Wilson | Nov. 6, 1956 |
| 2,799,662 | Ernst et al. | July 16, 1957 |

FOREIGN PATENTS

| | | |
|---|---|---|
| 513,483 | Canada | May 31, 1955 |

OTHER REFERENCES

Whitby: "Synthetic Rubber," John Wiley & Sons, New York, June 1954, page 3.